United States Patent
Riehl et al.

(10) Patent No.: US 12,552,721 B2
(45) Date of Patent: Feb. 17, 2026

(54) PVB-BASED SACRIFICIAL TACKIFIER FOR CMC

(71) Applicant: RTX Corporation, Farmington, CT (US)

(72) Inventors: John D. Riehl, Hebron, CT (US); Kathryn S. Read, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 85 days.

(21) Appl. No.: 18/379,297

(22) Filed: Oct. 12, 2023

(65) Prior Publication Data

US 2024/0043346 A1 Feb. 8, 2024

Related U.S. Application Data

(62) Division of application No. 17/460,688, filed on Aug. 30, 2021, now Pat. No. 11,820,717.

(51) Int. Cl.
*C04B 35/80* (2006.01)
*C04B 35/628* (2006.01)
*C04B 35/634* (2006.01)
*C04B 35/638* (2006.01)

(52) U.S. Cl.
CPC ........ *C04B 35/80* (2013.01); *C04B 35/62844* (2013.01); *C04B 35/62897* (2013.01); *C04B 35/6342* (2013.01); *C04B 35/638* (2013.01); *C04B 2235/5244* (2013.01); *C04B 2235/5256* (2013.01)

(58) Field of Classification Search
CPC .......................... C04B 35/80; C04B 35/6342
See application file for complete search history.

(56) References Cited

U.S. PATENT DOCUMENTS

| | | | |
|---|---|---|---|
| 4,396,663 A | 8/1983 | Mitchell et al. | |
| 4,820,568 A | 4/1989 | Harpell et al. | |
| 4,852,347 A | 8/1989 | Reynolds et al. | |
| 5,067,998 A | 11/1991 | Singh et al. | |
| 5,370,759 A * | 12/1994 | Hakotani ............ | H01L 21/4857 156/289 |
| 8,747,730 B2 | 6/2014 | Riehl | |
| 10,822,280 B2 | 11/2020 | Harris et al. | |
| 2003/0196305 A1* | 10/2003 | Kebbede ............... | C04B 35/653 29/402.09 |
| 2004/0086794 A1* | 5/2004 | Yamada ................. | G03G 5/051 430/66 |

(Continued)

FOREIGN PATENT DOCUMENTS

WO 2014053751 A1 4/2014

OTHER PUBLICATIONS

Extended European Search Report for EP Application No. 22192319.6, dated Feb. 2, 2023, 8 pages.

(Continued)

*Primary Examiner* — Robert A Vetere
(74) *Attorney, Agent, or Firm* — Kinney & Lange, P.A.

(57) ABSTRACT

A tackified ceramic fabric sheet includes a pre-preg layer having a fabric of woven ceramic tows and a tackifier compound surrounding the tows and comprising 15% to 60% polyvinyl butyral with ethanol. The sheet further includes a removable first backing film layer on a first side of the pre-preg layer.

11 Claims, 2 Drawing Sheets

(56) References Cited

U.S. PATENT DOCUMENTS

2007/0096371 A1* 5/2007 McGuigan .............. C04B 35/80
                                                    264/650
2008/0053592 A1* 3/2008 Khadilkar ........... C04B 35/6264
                                                    156/89.18
2012/0267833 A1   10/2012 Riehl
2016/0031762 A1    2/2016 Matsumoto
2017/0320785 A1   11/2017 Matsumoto et al.
2018/0061572 A1    3/2018 Kano et al.
2019/0161413 A1    5/2019 Jackson et al.

OTHER PUBLICATIONS

Extended European Search Report for EP Application No. 22192489.7, dated Feb. 2, 2023, 8 pages.

* cited by examiner

PVB-BASED SACRIFICIAL TACKIFIER FOR CMC

CROSS-REFERENCE TO RELATED APPLICATION(S)

This application is a divisional of U.S. application Ser. No. 17/460,688 filed Aug. 30, 2021 for "PVB-BASED SACRIFICIAL TACKIFIER FOR CMC" by J. Riehl and K. Read.

BACKGROUND

The present invention relates to ceramic matrix composites and, more particularly, to woven ceramic fabrics for use in ceramic matrix composites.

Tackifiers can be used in the manufacture of ceramic matrix composites (CMCs) to stabilize fiber build materials for cutting, kitting, and handling operations. Tackifiers also help bind together fiber layers during lay-up. While some existing tackifiers sufficiently bind fiber layers, they are less well suited for fiber stabilization during processing and lack the requisite tack to enable efficient lay-up of complex structures. This can lead to a reduction in overall quality of the resulting CMC component, and/or an increase in manufacturing costs.

SUMMARY

A tackified ceramic fabric sheet includes a pre-preg layer having a fabric of woven ceramic tows and a tackifier compound surrounding the tows and comprising 15% to 60% polyvinyl butyral with ethanol. The sheet further includes a removable first backing film layer on a first side of the pre-preg layer.

A method of forming a ceramic matrix composite component includes forming a plurality of plies from a tackified ceramic fabric sheet. The tackified ceramic fabric sheet includes a pre-preg layer with a fabric of woven ceramic tows and a tackifier compound surrounding the tows and comprising 15% to 60% polyvinyl butyral with ethanol, and a removable first backing film layer on a first side of the pre-preg layer. The method further includes laying up the plurality of plies into a preform structure, removing the ethanol from the plurality of plies while rigidizing the preform structure, and removing the polyvinyl butyral.

Figure 1:
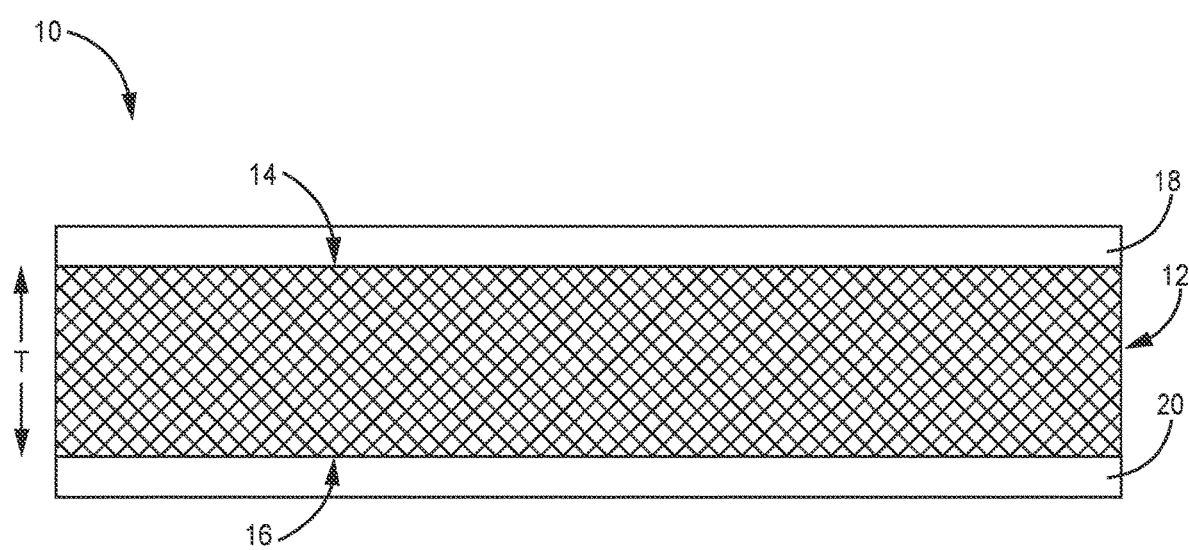
FIG. 1 is a cross-sectional view of a tackified ceramic fabric sheet.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a tackified ceramic fabric sheet for use in forming a CMC component. A woven ceramic fabric sheet is impregnated with a tackifier compound of a polymer resin and a solvent. The tackified fabric sheet has improved handling characteristics over sheets reinforced with other resin systems.

FIG. 1 is a simplified cross-sectional view of tackified fabric sheet 10. Sheet 10 includes pre-preg layer 12 with first outer surface 14 and oppositely disposed second outer surface 16. Removable backing layers 18 and 20 can be attached to first surface 14 and second surface 16, respectively, of pre-preg layer 12.

Pre-preg layer 12 can be formed as a dry woven ceramic fabric material impregnated with a tackifier compound which generally surrounds the tows within the fabric. The woven ceramic fabric can be formed from tows of silicon carbide (e.g., Hi-Nicalon™) or other suitable ceramics in various woven architectures. In an exemplary embodiment, the fabric can be an 8-harness satin weave. Other harness weaves (e.g., 3, 4, 5) as well as other woven architectures (e.g., plain, twill, braid, bias, etc.) are contemplated herein. The 8-harness satin woven ceramic fabric can further be a 16 ends-per-inch (EPI) or picks-per-inch (PPI) fabric with an areal weight of about 250 grams/square meter (GSM). Other EPI/PPI values ranging from, for example, 10 to 22 are contemplated herein. The tackifier compound can be a resin-solvent mixture of polyvinyl butaryl (PVB) and ethanol. The amount of PVB in the tackifier compound can range from 15% to 60%, and in an exemplary embodiment, from 30% to 40%. As used herein, a percentage of resin/PVB should be understood as a percentage by weight (wt %). The remainder of the compound can be ethanol, or in some embodiments, ethanol and inorganic particles, such as silicon carbide particles. Pre-preg layer 12 can further have a generally uniform thickness T (i.e., the distance from first surface 14 and second surface 16) ranging from 0.004 in (0.102 mm) to 0.015 in (0.381 mm), and in an exemplary embodiment, from 0.008 in (0.203 mm) to 0.012 in (0.305 mm).

First backing layer 18 and second backing layer 20 are removable backing layers that can facilitate transport and handling of sheet 10. Either/both backing layers 18 and 20 can be polymer films. If only one of backing layers 18, 20 is a polymer film, the other of backing layers 18, 20 can be a paper backing layer. Backing layers 18, 20 can help preserve/protect pre-preg layer 12, for example, by preventing evaporation of the ethanol, as well as by preventing pre-preg layer 12 from adhering to itself or equipment during handling of sheet 10.

Figure 2:
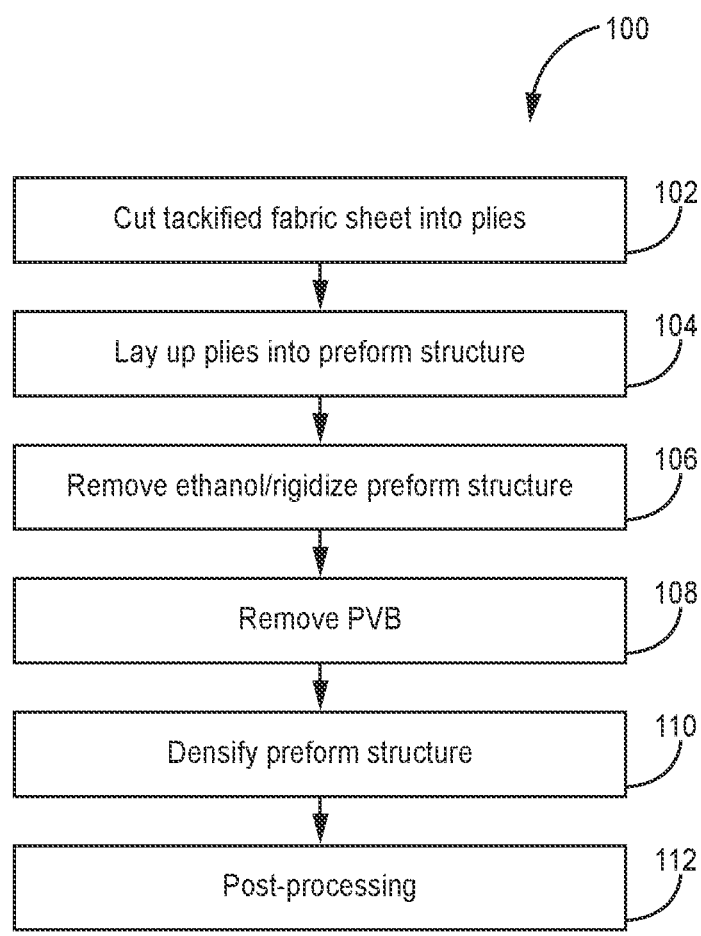
FIG. 2 is a flowchart illustrating a method of forming a CMC component from the tackified ceramic sheet.

FIG. 2 is a flowchart illustrating method 100 of forming a CMC component using sheet 10. Steps 102-112 of method 100 are discussed in combination with FIGS. 1 and 2.

At step 102, sheet 10 can be cut into multiple plies to be laid up in a preform structure. Cutting can be accomplished using a mechanical cutting device or other suitable means. Accordingly, each resulting ply will include a pre-preg layer 12 and either/both backing layers 18, The PVB-ethanol tackifier compound of pre-preg layer 12 can help stabilize the underlying woven fabric when sheet 10 is being cut such that there is little to no sheet distortion or fiber fraying.

At step 104, the plies cut from one or more sheets 10 can be laid up in a an end-to-end and/or layer-by-layer fashion to form a multidimensional preform structure. In many cases, the preform structure can be supported by one or more sets of rigid tooling, formed from materials such as plastic, steel, aluminum, and or graphite. The tooling can continue to support the preform structure through the matrix formation step, discussed in greater detail below. Backing layers 18, are removed during step 104 to permit contact between pre-preg layers 12 of abutting/overlapping plies. The PVB-ethanol tackifier compound of pre-preg layer 12 gives each ply a reversible adhesive quality such that pre-preg layer 12 will allow each ply to adhere to an underlying tooling surface or ply without shifting its position, while still allowing a ply to be removed and repositioned, if desired, without damaging the repositioned ply or any underlying plies.

At step 106, the ethanol within pre-preg layers 12 of the plies can be removed using one or a combination of heat and a vacuum, using, for example, a vacuum oven or other suitable equipment. After the ethanol has been removed, the PVB binds the layers together and stabilizes/rigidizes the preform. In one embodiment, step 106 is performed after the completion of step 104. In an alternative embodiment, step 106 can be performed in stages and overlapping with step 104 to treat portions of the preform during lay-up. The overlap of steps 104 and 106 will depend, for example, on such factors as size and complexity of the preform and the PVB and/or ethanol content of the tackifier compound.

At step 108, the PVB can be removed from the preform structure. In one embodiment, removal can constitute burning off/thermally decomposing the PVB by placing the preform in a nitrogen-rich ($N_2$) environment and exposing the preform to a temperature ranging from 500° F. (260° C.) to 1350° F. (732.2° C.), and in an exemplary embodiment, between 800° F. (426.7° C.) to 1150° F. (621.1° C.). In an alternative embodiment, the environment can include a mixture of nitrogen ($N_2$) and hydrogen ($H_2$) gases. The PVB burns off fairly cleanly, meaning that only insignificant amounts of ash from PVB, if any, remains after step 108. In an embodiment in which the tackifier includes inorganic (e.g., silicon carbide) particles, such particles remain incorporated into the preform structure after removal of the ethanol and PVB, and can facilitate matrix formation and densification. In another alternative embodiment, the PVB can be removed through other means by washing with ethanol or other suitable solvent without departing from the scope of the invention.

At step 110, the preform structure can undergo matrix formation and densification using one or a combination of chemical vapor infiltration or chemical vapor deposition (CVI or CVD). During densification, the plies are infiltrated by reactant vapors, and a gaseous precursor deposits on the fibers. The matrix material can be a silicon carbide or other suitable ceramic material. Densification is carried out until the resulting CMC has reached the desired residual porosity. In an alternative embodiment, densification can include other methodologies including, but not limited to, melt infiltration and polymer infiltration and pyrolysis (PIP).

At step 112, various post-processing steps can be performed, such as the application of one or more protective coatings (e.g., environmental and/or thermal barrier coatings). A bond coat can also be applied to facilitate bonding between the CMC and a protective coating. Other protective coatings, especially those suitable for use in a gas turbine engine environment, are contemplated herein. The resulting CMC formed with the tackified fabric can be incorporated into aerospace, maritime, or industrial equipment, to name a few, non-limiting examples.

DISCUSSION OF POSSIBLE EMBODIMENTS

The following are non-exclusive descriptions of possible embodiments of the present invention.

A tackified ceramic fabric sheet includes a pre-preg layer having a fabric of woven ceramic tows and a tackifier compound surrounding the tows and comprising 15% to 60% polyvinyl butyral with ethanol. The sheet further includes a removable first backing film layer on a first side of the pre-preg layer.

The sheet of the preceding paragraph can optionally include, additionally and/or alternatively, any one or more of the following features, configurations and/or additional components:

The above sheet can further include a removable second backing film layer on a second side of the pre-preg layer opposite the first side.

In any of the above sheets, the woven ceramic tows can include silicon carbide.

In any of the above sheets, the fabric of woven ceramic tows can have a harness woven architecture.

In any of the above sheets, the fabric of woven ceramic tows can be a 10 to 22 EPI or PPI fabric.

In any of the above sheets, the tackifier compound can comprise 30% to 40% polyvinyl butyral.

In any of the above sheets, the tackifier compound can further include inorganic particles.

In any of the above sheets, the pre-preg layer can have a thickness ranging from in to 0.015 in.

Any of the above sheets can be used in a method of forming a ceramic matrix composite component. The method includes forming a plurality of plies from the tackified ceramic fabric sheet, laying up the plurality of plies into a preform structure, removing the ethanol from the plurality of plies while rigidizing the preform structure, and removing the polyvinyl butyral.

In the above method, the step of laying up the plurality of plies can include removing the first backing film layer from each of the plurality of plies such that the preform structure is formed from the pre-preg layer of each of the plurality of plies.

In any of the above methods, the step of removing the ethanol while rigidizing the preform structure can include one or a combination of a heating the plurality of plies and applying a vacuum to the plurality of plies.

In any of the above methods, the step of removing the polyvinyl butyral can include burning off the polyvinyl butyral by heating the preform structure to a temperature ranging from 500° F. to 1350° F.

In any of the above methods, the step of removing the polyvinyl butyral can further include placing the preform structure in a nitrogen-rich environment.

Any of the above methods can further include densifying the preform structure using one or a combination of chemical vapor infiltration, chemical vapor deposition, polymer infiltration and pyrolysis, and melt infiltration.

A method of forming a ceramic matrix composite component includes forming a plurality of plies from a tackified ceramic fabric sheet. The tackified ceramic fabric sheet includes a pre-preg layer with a fabric of woven ceramic tows and a tackifier compound surrounding the tows and comprising 15% to 60% polyvinyl butyral with ethanol, and a removable first backing film layer on a first side of the pre-preg layer. The method further includes laying up the plurality of plies into a preform structure, removing the ethanol from the plurality of plies while rigidizing the preform structure, and burning off the polyvinyl butyral.

The method of the preceding paragraph can optionally include, additionally and/or alternatively, any one or more of the following features, configurations and/or additional components:

In the above method, the step of laying up the plurality of plies can include removing the first backing film layer from each of the plurality of plies such that the preform structure is formed from the pre-preg layer of each of the plurality of plies.

In any of the above methods, the step of removing the ethanol while rigidizing the preform structure can include one or a combination of a heating the plurality of plies and applying a vacuum to the plurality of plies.

In any of the above methods, the step of removing the polyvinyl butyral can include burning off the polyvinyl butyral by heating the preform structure to a temperature ranging from 500° F. to 1350° F.

In any of the above methods, the step of removing the polyvinyl butyral can further include placing the preform structure in a nitrogen-rich environment.

Any of the above methods can further include densifying the preform structure using one or a combination of chemical vapor infiltration, chemical vapor deposition, polymer infiltration and pyrolysis, and melt infiltration.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a ceramic matrix composite component, the method comprising:
    forming a plurality of plies from a tackified ceramic fabric sheet, the tackified ceramic fabric sheet comprising:
        a pre-preg layer comprising:
            a fabric of woven ceramic tows;
            a tackifier compound impregnating the fabric and comprising 15% to 60% polyvinyl butyral in ethanol, wherein the remainder of the tackifier compound is ethanol and wherein the tackifier compound is the sole impregnating compound; and
        a removable first backing film layer on a first side of the pre-preg layer;
    laying up the plurality of plies into a preform structure;
    removing the ethanol from the plurality of plies while stabilizing the preform structure;
    subsequently, removing the polyvinyl butyral; and
    densifying the preform structure with a matrix.

2. The method of claim 1, wherein the step of laying up the plurality of plies comprises removing the first backing film layer from each of the plurality of plies such that the preform structure is formed from the pre-preg layer of each of the plurality of plies.

3. The method of claim 1, wherein the step of removing the ethanol while rigidizing the preform structure comprises one or a combination of heating the plurality of plies and applying a vacuum to the plurality of plies.

4. The method of claim 1, wherein the step of removing the polyvinyl butyral comprises burning off the polyvinyl butyral by heating the preform structure to a temperature ranging from 500° F. to 1350° F.

5. The method of claim 4, wherein the temperature ranges from 800° F. to 1150° F.

6. The method of claim 4, wherein the step of removing the polyvinyl butyral further comprises placing the preform structure in a nitrogen-rich environment.

7. The method of claim 4, wherein the step of removing the polyvinyl butyral further comprises placing the preform structure in an environment having a mixture of nitrogen gas and hydrogen gas.

8. The method of claim 1, wherein densifying the preform structure with a matrix is carried using one or a combination of chemical vapor infiltration, chemical vapor deposition, polymer infiltration and pyrolysis, and melt infiltration.

9. The method of claim 1, wherein the matrix comprises silicon carbide.

10. The method of claim 1, wherein the ceramic tows comprise silicon carbide.

11. The method of claim 1, wherein the tackifier compound comprises 30% to 40% polyvinyl butyral in ethanol.

* * * * *